Patented June 29, 1943

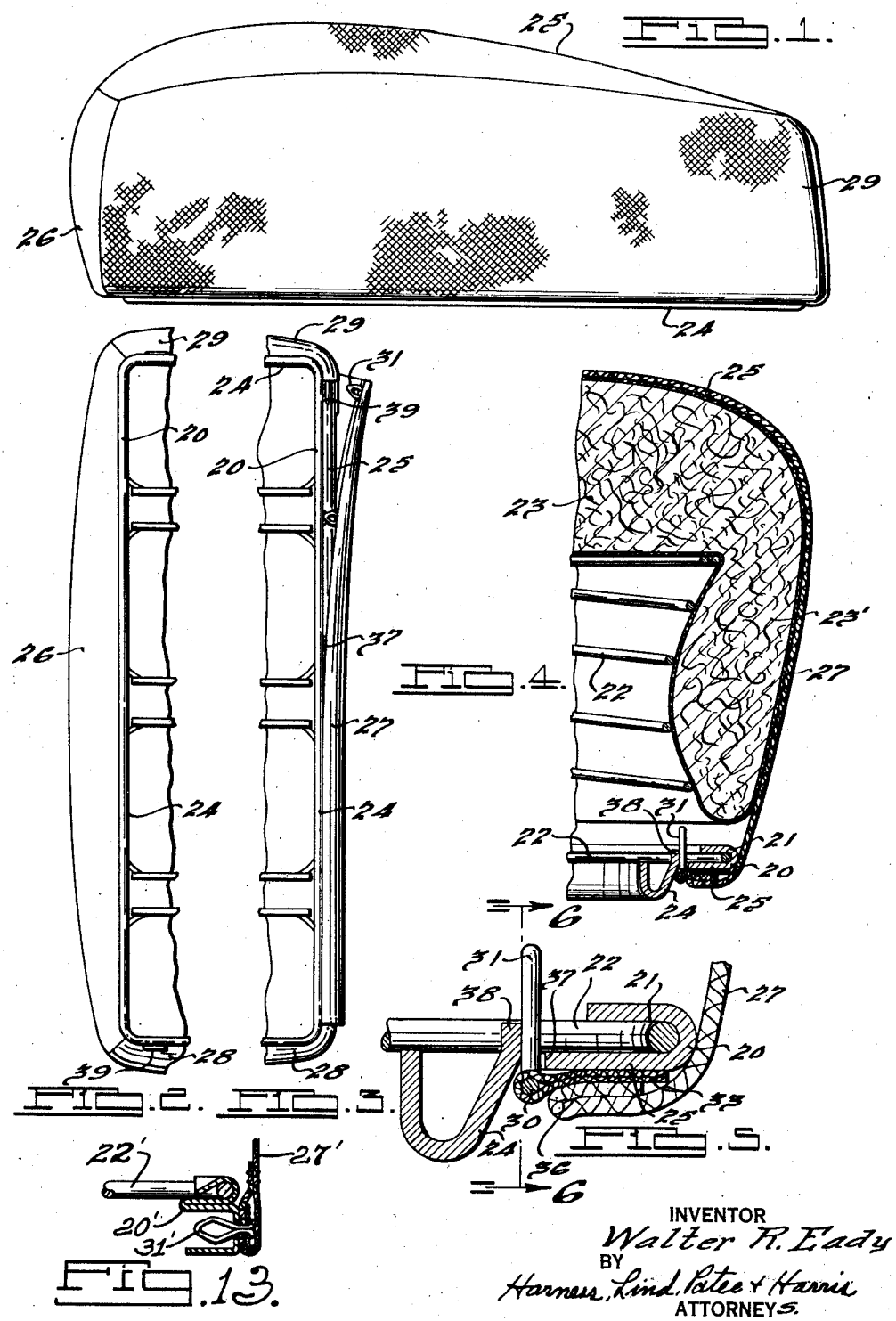

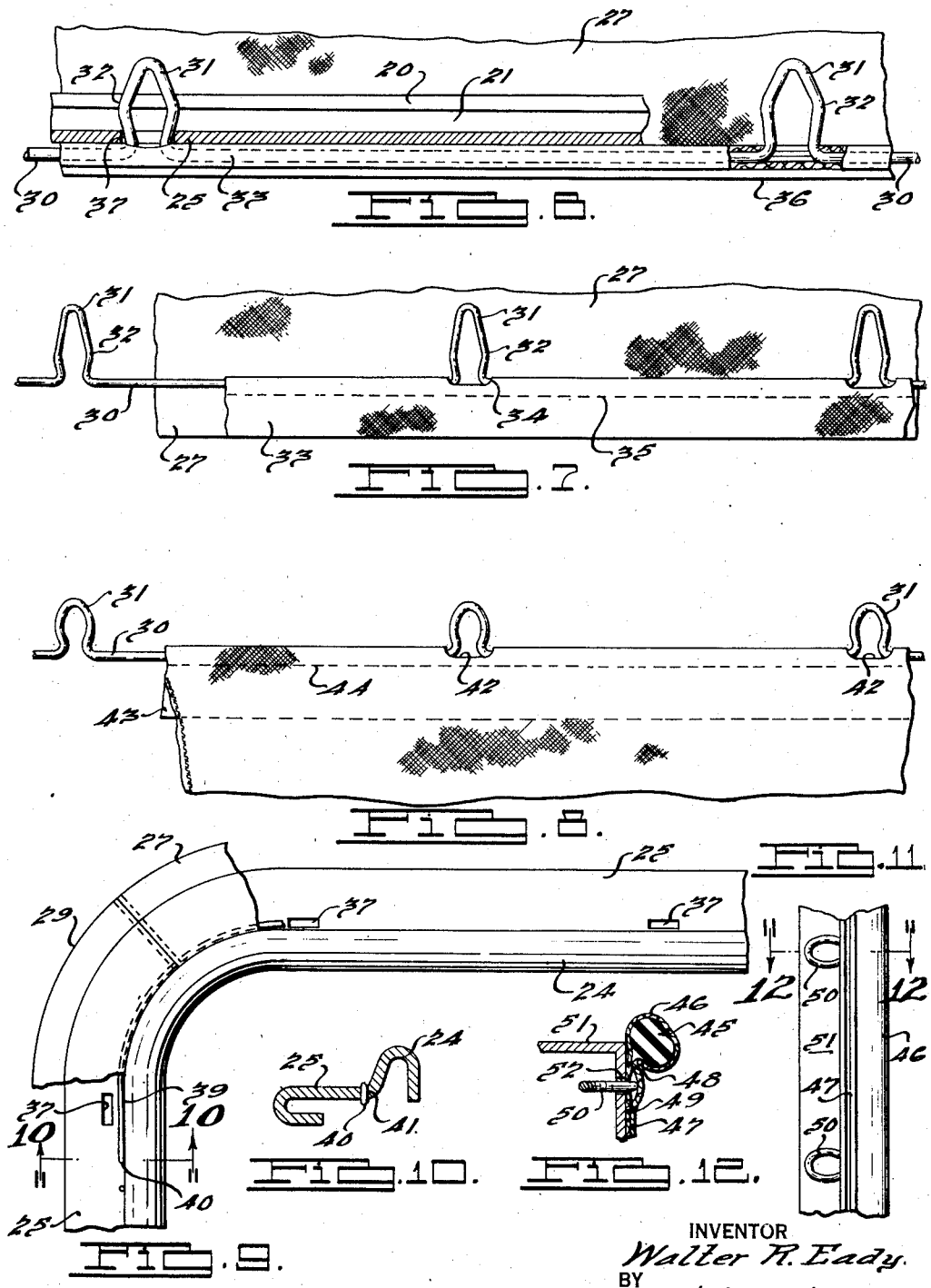

2,322,836

UNITED STATES PATENT OFFICE 2,322,836

TRIM MATERIAL

Walter R. Eady, Royal Oak, Mich., assignor to Chrysler Corporation, Highland Park, Mich., a corporation of Delaware Application July 8, 1940, Serial No. 344,366

4 Claims. (Cl. 155—180)

The present invention is concerned with the securing of upholstery or trim material in a manner so that the material is held at every point along its secured edges, rather than only at spaced intervals, and which at the same time permits the ready removal and replacement of the material. More particularly, the invention is concerned with a novel method and means providing a continuous, yet detachable, connection between the frame of a seat or back of an automobile or the like and the material which covers said parts.

It is the present practice in attaching upholstery or covering material to seats, backs or the like parts of automobile or similar bodies to the frames of said seats, backs or the like to stretch the upholstery or covering material around the part, placing the springs usually included therein under tension, and while the springs are under tension tacking the edges of the upholstery or covering material to the frame of the part. The application of upholstery or covering material in this manner is difficult when, as is the practice in the automobile industry, the operation is carried out while the parts are moving along assembly lines. The need for a certain amount of expedition in securing the covering results in many imperfections and unsatisfactory application of the upholstery material. Accordingly, much labor must be expended upon the upholstered parts, after they have been removed from the assembly line, in correcting defects discovered therein upon the usual inspection.

Inasmuch as the upholstery or covering material is tacked to the frame only at spaced intervals, when the compressed springs are released and the upholstery or covering material drawn taut, irregularities appear in the finished part between the tacks. This is a further objection inherent in present practices.

Furthermore, since the frames of seats, backs or the like of automobiles or similar bodies are frequently now constructed of metal, it is necessary to provide some means to enable the upholstery or covering material to be tacked to the frames. The present practice is to insert compacted paper permeated with an adhesive in a channel or groove provided in the metal frame. The tacks to secure the covering or upholstery material are driven into said compacted paper. Frequently the tacks do not hold and the application of the covering material then becomes thoroughly unsatisfactory, and much labor must be devoted to a correction of defectively applied upholstery material after the parts leave the assembly line.

The primary purpose of the present invention is to provide an improved method and arrangement for attaching the upholstery or covering material to the frames of parts, such as seats, backs or the like of automobiles or similar bodies that will result in a satisfactory securing of said material though the application be effected in a moving assembly line.

A further principal object of the invention is to provide an improved way of attaching trim or upholstery material which will hold the material at every point along the secured edges thereof and that at the same time will permit ready removal and replacement of the material when this is necessary or desirable.

A still further object of the invention is to provide an improved continuous metal fastener for application to upholstery or covering material coextensively of an edge or of the edges thereof, the improved fastener strip having formed as an integral part thereof the fastener elements designed for snap fastener engagement with suitable openings or sockets in the frame of the part to which the material is applied.

A still further object of the invention is to provide an improved metal fastener strip designed for attachment to covering or like material and including a multiplicity of open crimps so designed that when the crimps are engaged with the frame of the part to which the covering material is applied, the portions of the fastener strip between the crimps are caused to lie snugly against the frame to thereby hold the upholstery or covering material, which is carried by the strips, snugly against the frame between the points of attachment of the strip to the frame.

Still another object of the invention is to provide an improved frame construction for a removable or like seat so designed that the weight of the seat, and occupants thereof, is transmitted to the supporting structure for the seat from the frame directly to said structure independently of the underlapped edges of the covering material for the seat and of the means which secures said material to the frame to the end that wear on the underlapped edges of the upholstery material is minimized.

Still further objects of the invention will appear as the description thereof proceeds with reference to the accompanying drawings in which:

Figure 1 is an edge elevational view of a seat having the covering material therefor secured to the seat frame in accordance with the present invention;

Fig. 2 is a fragmentary view of one side of the seat looking at the bottom thereof;

Fig. 3 is a bottom plan view of a portion of a seat constructed in accordance with the present invention, one of the edges of the covering material being detached to disclose the mode of securing the edges of the covering to the seat frame;

Fig. 4 is an enlarged sectional view taken transversely of an edge of the seat;

Fig. 5 is a further enlarged transverse sectional view of the lower portion of Fig. 4 illustrating clearly a preferred way of attaching the fastener strips to the edges of the covering material;

Fig. 6 is a longitudinal sectional view taken on the plane indicated by the line 6—6 in Fig. 5 looking in the direction of the arrows;

Fig. 7 is a fragmentary plan view further showing the mode of securing the fastener strip to the covering edge;

Fig. 8 is a fragmentary plan view showing a modified mode of attaching the fastener strips to the fabric edges;

Fig. 9 is a fragmentary plan view of a corner of the frame for the seat illustrating how the fastener strips are applied at the corners of the frame;

Fig. 10 is a sectional view taken on the plane 10—10 of Fig. 9;

Fig. 11 is an elevational view showing how the fastener strip of the present invention may be utilized in securing a weatherstrip cord to the door frame of an automobile body.

Fig. 12 is a sectional view taken on the plane 12—12 of Fig. 11 looking in the direction of the arrows.

Fig. 13 is a fragmentary sectional view showing a modification of the invention in which the trim material is secured to the side of the seat frame.

The drawings presently to be described illustrate how the present invention is utilized in securing detachable upholstery or trim material to a removable seat for an automobile or like body, and to the attachment of a weatherstrip to the automobile body structure. The uses illustrated are intended to provide examples of how the present invention may be used. It will be understood, however, that it may be used to secure the upholstery material to the backs of seats of automobiles or the like, and that it may obviously be also used in securing the finished material to the interior of automobile bodies. The application of the invention to such further uses will be obvious to a person skilled in the art from the appended description of the named specific uses.

Referring now to the drawings, 20 designates the metal frame of a removable seat of an automobile, for example, said frame having a channel 21 formed around the entire periphery thereof. Said channel receives the end convolutions of a multiplicity of coiled springs 22, upon which are supported properly encased cushioning materials 23, which may, if desired, extend downwardly along the sides of the springs 22 and the cushioning materials constitute the seat assembly, which is attached to the frame 20 in conventional manner and constitute no part of the present invention.

The present invention contemplates, however, an improvement in the frame 20, by providing it with a downwardly projecting bead or corrugation 24 extending around the inner periphery thereof. The bead or corrugation 24 is formed of sufficient height so that when the covering material for the seat is secured against the body portion 25 of the frame, as hereinafter described, the edges of the covering material, as well as the fastening means, will be disposed in the recess in the frame formed by the bead or corrugation 24 outwardly of said bead or corrugation. The purpose of this arrangement is to sustain the load on the seat independently of the inturned edges of the upholstery material and of the fastening means, it being readily understood that when the seat is placed upon its support the bead or corrugation 24 contacts said support and the load of the seat is transmitted through the bead to the support independently of the upholstery material and the means that fastens it to the seat.

The cover for the seat comprises a top portion 25 and portions 26, 27, 28 and 29 lapping respectively the front, back and ends of the seat, the latter being formed for separate attachment to the seat frame. The end, front and back of the cover are attached to each other and to the body or top portion 25 of the seat cover. The fastening means presently to be described are attached to each edge portion, that is, a separate fastener strip is provided for each edge of the cover, the fastener strip for each edge being preferably made of sufficient length so that it is at least coextensive with the length of said edge.

The preferred form of fastener strip consists in a single piece of wire 30 having a multiplicity of open crimps 31 formed at intervals along the length thereof. The crimps 31 are constructed so that they are wider at the mid-portion thereof as indicated at 32 for a purchase presently to be described.

Each fastener strip is preferably secured to an edge of the covering material by first attaching to the fastener strip a piece of doubled fabric of suitable nature 33, provided with a multiplicity of holes 34 through which the crimps 31 extend. Stitching 35 serves to secure the fabric strip to the fastener strip. Strip 33 with the fastener strip secured thereto is then disposed upon an edge as the edge 27 of the covering in the manner illustrated in Fig. 7 of the drawings and the strip 33 is then sewed to the edge 27 providing a continuous connection between the fastener strip and the edge of the cover.

After fastener strips are applied to each of the edges of the cover for the seat, the latter is then ready to be secured in place. It will be understood that the attachment of the fastener strips to each of the edges of the cover is accomplished on a suitable bench or table prior to the application of the cover to the spring assembly and frame of the seat, which final operations are preferably carried out in an assembly line. The covers can, accordingly, be cut accurately and the fastener strips are likewise applied with a high degree of accuracy, so that when the cover is subsequently applied to the frame and the spring assembly, a nice fit is certain to result.

In applying the cover to the seat, the body of the cover is placed over the spring assembly and the edges folded around the edges of said assembly whereupon pressure is applied to the seat causing a compression of the springs 22. As is customary the cover is made in insufficient size to cover the seat unless the springs 22 are placed under considerable compression. After said springs have been sufficiently compressed the edges of the fabric cover can be brought around the underside of the frame 20. The margins of said edges are then turned back as illustrated best in Fig. 5 producing a fold 36 in the cover and exposing the end of the doubled strip 33 in which the metallic fastener strip is mounted. The crimps 31 which constitute individual fasteners formed as an integral part of the fastener strip are then entered in succession in openings 37 in the body 25 of the frame 20. The openings 37 are preferably rectangular in cross form, though they obviously may assume any other appropriate form. It is essential, however, that the openings have a cross dimension substantially less than the normal width of the crimps adjacent the straight portion of the strip that is secured to the cover.

If desired, the openings 37 may be formed by U-shaped incisions in the body 25, and by then bending tongues 38 inwardly of the frame (Fig. 5) for a purpose presently to be stated.

In passing the crimps 31 in succession through the openings 37 said crimps are contracted to permit the widest portions 32 thereof to pass through the opening. After this portion of each crimp passes through said opening the crimps again open as far as permitted by the wall of the opening. Since, as already stated, the opposite walls of the openings are spaced less than the width of the inner portion of the crimps, said crimps will not be permitted to resume their original condition, but will be maintained under some compression as is clear from a comparison of the crimp at the left of Fig. 6 with that on the right hand portion of said figure. It will be understood that the fastener strip is constructed of tempered wire, or any other suitable material, so that it possesses a high degree of resilience, the effect of which, when the crimps are maintained under lateral compression after they have been passed through the opening 37, is to cause the portions of the fastener strip between adjacent openings to be firmly drawn into contact with the body 25 of the frame thus insuring that the fastener strips and the covering material attached thereto lies absolutely snugly against the body 25 of the frame. In this way the covering material is firmly held against the frame at every point along the edge thereof rather than only at spaced intervals, as is now the customary practice.

It will be understood that once the crimps have been engaged in succession with the openings in the frame the covering material is firmly held in position, the widened portions of the crimps preventing ready withdrawal of the fastening elements from the openings though said elements can be withdrawn by prying the fastener strip away from the frame when the crimps are again flattened and can be removed when it is desired to repair or replace the upholstery material. Thus the present invention provides a way of detachably securing covering material to an automobile or the like.

It will be observed that when the crimps are engaged with the frame which is accomplished while the spring assembly is under compression, no release of the tension on the covering material takes place in engaging said crimps with the opening in the frame. The tension under which the cover is applied is thus maintained and since the pull of the cover under tension is laterally of the fastener strip or in a direction normal to that in which the crimps were engaged with the openings in the frame the pull of the cover does not tend to disengage the fastener strip from the frame.

When the inwardly bent tongues 38 are utilized the crimps bear against the side thereof, thus preventing any rocking of the crimps in the openings in the frame. A firm and unyielding connection between the cover and the frame is thus provided, the edge of the cover being held at every point along its length so that the same degree of tension is applied to the cover at every point along the length of its edges.

In order to provide neat corners the construction illustrated in Figs. 2, 3, 9 and 10 is utilized. As illustrated in these figures the fastener strips attached to the end edges of the cover extend beyond the edges of said portions as indicated at 39. The ends of the extensions 39 are turned downwardly as indicated at 40 and pass through openings 41 in the body 25 of the frame 20 providing a convenient way of securing the protruding ends of the fastener strips to the frame. Preferably one of the openings 37 is arranged so that the projecting ends of the fastener strips will be located adjacent thereto so that when the crimp of the fastener strip attached to the adjacent edge portion of the cover is engaged therewith, the fastening strips will be disposed in overlapped relation at the corner, thus insuring the holding of the edge portions at said corners without visible imperfection on the exposed corner of the seat. While the arrangement of finishing the corners just described is at present preferred, it will be understood that other ways of securing the margins of the cover at the corners of the seat may be utilized.

Instead of utilizing a separate strip to attach the metal fastening strip to each edge of the cover the fastener strip may be secured to each edge of the cover directly by simply perforating the cover adjacent its margin to permit the passage of the crimps 31 therethrough as indicated at 42 in Fig. 8. After said crimps are inserted in the openings 42 the margins 43 of the cover are turned back and stitched along the line parallel to the straight portions of the fastener strips as indicated at 44, thus firmly securing the fastener strips to the edges of the cover. As illustrated in Fig. 8 the crimps 31 may assume an ovoidal form rather than the form illustrated in Figs. 6 and 7. It will be readily seen that the ovoidal form is the functional equivalent of that illustrated in Figs. 6 and 7.

Figs. 11 and 12 illustrate how the fastener strip is applied in the attachment of a weatherstrip consisting of rubber or like resilient and compressible strip 45 encased in a fabric covering 46. A continuous fastener strip 47 is suitably secured between the overlapped edges of the covering 46 by lines of stitches 48 and 49, openings being provided in one of the layers of the overlapped fabric edges to permit the passage of the crimps 70 of said strip.

The weatherstrip may be applied to the frame 51 by passing the crimps 50 through properly spaced openings 52 provided in said frame portions. The engagement of the crimps with the frame may be accomplished with great facility and once said engagement is brought about it will be readily understood that the continuous fastener strip holds the weatherstrip against the frame 51 at every point along the length of the strip. As in the former fastener strip first described the crimps are formed so that they are open and the openings 52 in the frame 51 are made of such size that said crimps are closed partially when they are forced into the openings in the frame thus insuring that the fastener strip lies snugly in contact with the frame between the openings.

Various kinds of trim material and the covering for the backs of seats may be applied by the means of fastener strips constructed in accordance with the present invention as will be obvious to a person skilled in the art.

In the form of the invention shown in Fig. 13, the trim material 27' is secured to the side of the seat frame 20'. The frame is folded to a double channel with the spring 22' secured in the upper channel. The upper flange being folded over the coil of the spring to secure it in place. Openings 37' are formed in the side wall of the bottom channel to receive the fastener elements 31' which are integrally connected as described above and received in the stitched fold at the edge of the trim material 27'.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A seat for an automobile or the like, comprising a frame having spaced apertures therein, a spring assembly secured to said frame, a cover for said assembly having overlapping edges, metal strips attached continuously along each edge of said cover, certain of said strips extending outwardly beyond the overlapping edges of the cover at the corners thereof and having downwardly turned ends, and crimps in said strips sprung into said apertures, said outwardly extending portions of the strips underlying adjacent overlapping edges of said cover other than those to which they are attached with the downwardly turned ends received in apertures in said frame whereby neat upholstered corners are provided.

2. A seat or the like comprising a metal frame having rounded edge portions, flat intermediate portions and bead-like supporting portions, a multiplicity of tongues struck from said intermediate portions, a spring assembly secured to said frame, a cover for said assembly having wires extending continuously along said cover edges, and loops formed as a part of said wires, said cover extending around said rounded edge portions and said loops received in openings formed by said struck up tongues and lying against said tongues to prevent rocking of said loops, the thickness of said cover edges and said wire at any side of said seat being less than the height of said bead-like supporting portions.

3. A removable seat for a vehicle or the like, comprising a frame having a channel to receive portions of the spring assembly for the seat around the outer edge thereof, an intermediate portion having fastener receiving openings, and a bead projecting downwardly from the frame around the other edge thereof, a spring assembly secured to said frame with portions in said channel thereof, a cover having continuous wires attached to its edges, said wire having integral fastening means engaged with walls of said openings to secure the cover to said frame, said edges lapping said frame around the outside of said channel and being disposed with said means against said frame outwardly of said bead, said bead having a height extending the thickness of said edges and wire that overlie said frame, whereby said seat may be supported on said bead independently of said cover and means.

4. A seat for an automobile or the like, comprising a frame having spaced apertures therein, a spring assembly secured to said frame, a cover for said assembly having overlapping edges at the corners thereof, a metal strip attached continuously along each edge of said cover, certain of said strips extending outwardly beyond the overlapping edges of the cover adjacent corners of said frame, and crimps in said strips sprung into said apertures, said outwardly extending portions of the strips each underlying adjacent overlapping edges of said cover other than that to which it is attached whereby neat upholstered corners are provided.

WALTER R. EADY.

CERTIFICATE OF CORRECTION.

Patent No. 2,322,836. June 29, 1943.

WALTER R. EADY.

It is hereby certified that error appears in the printed specification of the above numbered patent requiring correction as follows: Page 4, second column, line 31, claim 3, for "extending" read --exceeding--; and that the said Letters Patent should be read with this correction therein that the same may conform to the record of the case in the Patent Office.

Signed and sealed this 14th day of September, A. D. 1943.

(Seal)
                                        Henry Van Arsdale,
                               Acting Commissioner of Patents.